United States Patent [19]

Aime et al.

[11] Patent Number: 4,873,270

[45] Date of Patent: Oct. 10, 1989

[54] POLYURETHANE-CARBOHYDRATE-BASED SUBSTANCES WHICH CAN BE CALENDERED TO PRODUCE BIODEGRADABLE MATERIALS

[75] Inventors: Jean-Marc Aime, Creil; Georges Mention, Compiegne; André Thouzeau, Paris, all of France

[73] Assignee: Charbonnages De France, Paris, France

[21] Appl. No.: 153,889

[22] Filed: Feb. 9, 1988

[30] Foreign Application Priority Data

Feb. 10, 1987 [FR] France .................................. 87 01623

[51] Int. Cl.⁴ ............................ C08J 3/04; C08L 3/04
[52] U.S. Cl. ........................................ 523/128; 524/35; 524/40; 524/48; 524/52; 524/56; 524/58
[58] Field of Search ........................ 524/35, 40, 48, 56, 524/58, 52; 523/128

[56] References Cited

U.S. PATENT DOCUMENTS

| | | | |
|---|---|---|---|
| 3,281,267 | 10/1966 | Rice | 524/40 |
| 3,850,862 | 11/1974 | Clendinning et al. | 523/128 |
| 3,850,863 | 11/1974 | Clendinning et al. | 523/128 |
| 4,002,171 | 1/1977 | Taft | 428/264 |

*Primary Examiner*—John Kight
*Assistant Examiner*—Frederick Krass
*Attorney, Agent, or Firm*—Browdy and Neimark

[57] ABSTRACT

A substance based on polyurethane from which biodegradable materials can be obtained by rolling comprises, as well as a polyurethane resin serving as its essential constituent, a carbohydrate, at least one second thermoplastic polymer which is miscible in the molten state with the polyurethane resin and/or at least one third biodegradable polymer chosen from among biodegradable aliphatic polyesters, preferably of the same nature as the polyurethane resin used.

19 Claims, No Drawings

POLYURETHANE-CARBOHYDRATE-BASED SUBSTANCES WHICH CAN BE CALENDERED TO PRODUCE BIODEGRADABLE MATERIALS

BACKGROUND OF THE INVENTION

1. Field of the invention

The present invention concerns biodegradable polyurethane-based sheets, films or plates, and their production by rolling.

2. Description of the prior art

Blow extrusion of polyurethane and finely ground starch mixtures to form biodegradable sheets is already known (GB patent 1 524 821). Such mixtures, however, cannot be rolled under acceptable production conditions. In addition, the biodegradability and mechanical properties of the sheets obtained may be insufficient having regard to the nature of the polyurethane used.

SUMMARY OF THE INVENTION

The aim of the present invention is to produce polyurethane-based sheets, films and plates (hereinafter termed "products") having good biodegradability and mechanical properties and which may be obtained by rolling, i.e. calendering, under conditions which are generally utilized for example for producing flexible PVC sheets (comparable machine speed, standard calendering line, etc).

Consequently, the invention principally concerns the substances used to produce these materials. However, the invention also encompasses the materials produced in this way and specific products fabricated from such materials.

According to the invention, these substances comprise apart from the polyurethane resin which is the essential constituent, a carbohydrate, at least one second thermoplastic polymer which is miscible, in the molten state, with said polyurethane resin and/or at least one third biodegradable polymer selected from among biodegradable aliphatic polyesters, preferably of the same nature as the polyester base of the polyurethane utilized.

Preferably, the second polymer is PVC or a mixture of PVC and a monomeric or polymeric PVC plasticizer.

The plasticizer is, for example, a phthalate such as dioctylphthalate.

The second polymer, plasticized if necessary, is not in itself biodegradable and is preferably used in as small a quantity as possible if biodegradability is the principal property required. The proprotion will be a function of the amount of carbohydrate used, with respect to which it may be 25 to 100 weight percent.

The polyurethane used is chosen from among thermoplastic aliphatic polyester-based polyurethanes. The polyester base is preferably chosen from among base compounds having the best biodegradability, for example poly-ε-caprolactone or poly-β-caprolactone. A polycaprolactone-based polyurethane may be used, for example.

Advantageoously, a substance according to the invention combines a polycaprolactone (third polymer) with a polycaprolactone-based polyurethane.

The third polymer, when present in the inventive substance, may be present in a proportion of 0 to 20 weight percent with respect to the whole mixture.

Poly-β-hydroxybutyrate and polyhydroxyvalerate may equally well be used.

The carbohydrate is a compound in fine particle form such as potato flour, starch, modified starch, cellulose, cellulose derivatives, dextrin, lactose, manitol or lignin, and is used in a proportion of 10 to 45 weight percent with respect to the whole mixture.

The applicants have established that the presence of the third polymer can facilitate production and increase the biodegradability and mechanical properties of the products obtained.

The substances according to the invention comprise, in addition, standard additives used in the rolling industry: lubricants, pigments, colorants, stabilizers, antioxidants, antiblockers, etc, well known to the person skilled in the art.

The substances according to the invention are made into various products using standard calendering techniques such as that used for the production of PVC sheets. It should be noted that the apparatus used for PVC may be used without modification and with equivalent production rates.

Other known manufacturing techniques such as, for example, flat die extrusion rolling, injection, etc may equally well be used, if necessary, in place of calendering to produce equivalent sheets, films or plates.

Products according to the invention have properties which are, of course, dependent on the formulation of the substance.

The total biodegradability may reach 96% by weight. The rate of biodegradation, determined according to the AFNOR NFX 41-514 standard (burial of a 0.15 mm thick sheet in normalised soil at 30° C., 95% relative humidity), leads to a total loss of mechanical characteristics of the sheet in a time which could be less than a month.

The products obtained are elastic and can be welded, including by high frequency welding. They have an agreeable and soft feel due to the association of polyurethane and carbohydrate.

They have mechanical characteristics which render them suitable for use, for example, in the packaging art.

They are stable when stored under normal conditions.

The products according to the invention may be used:
- as mortuary wrappings conforming to French law (casket cover, shroud and quilting);
- as agricultural films;
- as flexible packaging films;
- as filling or padding materials.

EXAMPLES

Example 1

The following were tumble blended at room temperature:
- 40 parts of polycaprolactone-based polyurethane and 13.5 parts polycaprolactone, and
- 13.5 parts PVC, 5.5 parts dioctylphthalate, 27 parts potato flour and 0.5 parts of an organometallic stabilizer.

The two mixtures were then homogenized in an internal mixer operating at 160° C. for a few minutes.

The mixture was worked up by calendering in a 4-roll calender mill with roller temperatures between 160° C. and 120° C.

In this way a film 0.12 mm thick and 2 meters wide was produced at a linear speed of 30 meters per minute.

(1) The film has the following mechanical characteristics

(a) Mechanical characteristics under tension at 23° C., according to French Standard NFT 54-102:

| | |
|---|---|
| modulus at 100% elongation: | 9 MPa, |
| rupture strength: | 15 MPa, |
| elongation at rupture: | 250; |

(b) Tear resistance at 23° C., according to French Standard NFT 46-007 and ISO Standard 34:

| | |
|---|---|
| curved, notched test piece, at a pulling speed of 50 mm/min: | |
| in the transverse direction: | 6 MPa, |
| in the machine direction: | 7 MPa; |
| at a pulling speed of 500 mm/min: | |
| in the transverse direction: | 7.5 MPa, |
| in the machine direction: | 9 MPa; |
| curved, unnotched test piece: | |
| at a pulling speed of 50 mm/min: | |
| in the transverse direction: | 22 MPa, |
| in the machine direction: | 25 MPa; |
| at a pulling speed of 500 mm/min: | |
| in the transverse direction: | 12 MPa, |
| in the machine direction: | 12 MPa; |
| angled, notched test piece: | |
| in the transverse direction: | 6 MPa, |
| in the machine direction: | 6 MPa. |

(2) Biodegradability

In application of French Standard NFX 41-514, deterioration of the mechanical properties of the film was observed. More precisely:

after a week the film had been completely invaded by mold (color change); further examination using a scanning electron microscope showed a very distinct formation of three-dimensional networks corresponding to the mold invasion;

after two weeks burial the scanning electron microscope showed microfissure formation characteristic of polyurethane degradation;

after ten weeks, the fissures in the sample were visible to the naked eye. By then the sample was fragmented and had lost all its mechanical properties.

Example 2

With the aim of producing a sheet with increased biodegradability, the method of example 1 was used with the following proportions:

40 parts polyurethane,
18 parts polycaprolactone,
4.5 parts PVC,
4 parts DOP,
33 parts potato flour,
0.5 parts stabilizer.

A biodegradability test according to French Standard NFX 41-514 was carried out on the sheet obtained:

after three days, a color change characterizing the onset of mold invasion was observed;

after one week, the sheet had been totally invaded by mold and was very dark in color;

after two weeks, mechanical fragmentation was visible with the naked eye, along with an increase in the surrounding microfauna;

after four weeks, the sample material had partly disappeared with consequent total loss of mechanical properties.

Example 3

The method of example 1 was used with the following proportions:

40 parts polyurethane,
25 parts polycaprolactone,
5 parts PVC,
4 parts DOP
25 parts pototo flour,
1 part other additives.

The biodegradability of the sheet produced was determined firstly under ordinary conditions and secondly with the film under tension within its elastic limit. Fragmentation on a microscopic scale was observed using the scanning electron microscope, the time taken being reduced from ten weeks to five weeks when the film was under tension.

The test showed that even with a substance containing a high proportion of polymer the degradation rate remained high.

It goes without saying that the present invention has been described by way of non-limiting illustration only and that any modifications may be made, particularly as regards equivalent techniques, without departing from the scope of the invention.

We claim:

1. Polyurethane-based substance which can be calendered to produce a biodegradable material, comprising a homogeneous mixture of a thermoplastic polyurethane resin, a carbohydrate, at least one second thermoplastic polymer which is miscible in the molten state with said polyurethane rein and which gives the mixture the ability to be calendered and which comprises polyvinylchloride, and at least one third biodegradable polymer different from said polyurethane resin and which is a biodegradable aliphatic polyester.

2. Substance according to claim 1, wherein said polyurethane resin has a polyester base, and said at least one third biodegradable polymer is of the same nature as the polyester base of said polyurethane.

3. Substance according to claim 1, wherein said second polymer consists essentially of polyvinylchloride or a mixture of polyvinylchloride and a monomeric or polymeric polyvinylchloride plasticizer.

4. Substance according to claim 3, wherein said plasticizer is a phthalate.

5. Substance according to claim 4, wherein said plasticizer is dioctylphthalate.

6. Substance according to claim 3, wherein said second polymer is present in the amount of 25 to 100 % by weight with respect to the amount of carbohydrate.

7. Substance according to claim 1, wherein said carbohydrate is a compound selected from the group consisting of potato flour, starch, modified starch, cellulose, cellulose derivatives, dextrin, and lactose and is used in a proportion of 10 to 45 % by weight with respect to the whole mixture.

8. Substance according to claim 1, wherein said polyurethane resin is a polycaprolactone based polyurethane.

9. Substance according to claim 8, wherein said polycaprolactone is poly-ε-caprolactone or poly-β-caprolactone.

10. Substance according to claim 1, wherein said third polymer is present in a proportion of up to 20 weight percent with respect to the whole mixture.

11. Substance according to claim 1, wherein said third polymer is a caprolactone and said polyurethane resin is a caprolactone-based polyurethane.

12. Substance according to claim 1, wherein said third polymer is a poly-β-hydroxybutyrate or a polyhydroxyvalerate.

13. A method of manufacturing biodegradable sheet, film, and plate products, comprising forming a polyurethane-based substance according to claim 1 into a sheet, film or plate.

14. A product in biodegradable sheet, film or plate form manufactured from a polyurethane-based substance according to claim 1.

15. Mortuary wrappings, agricultural films, flexible packaging films, filling materials and padding materials manufactured from a polyurethane-based substance according to claim 1.

16. A method according to claim 13 wherein said forming is carried out by calendering.

17. A product according to claim 14 wherein said sheet, film or plate is manufactured by calendering.

18. Mortuary wrappings, agricultural films, flexible packaging films, filling materials and padding materials according to claim 15 made by calendering.

19. A biodegradable homogeneous plastic composition comprising a thermoplastic polyurethane resin, an amount sufficient of a carbohydrate in fine particle form to make such composition in film form biodegradable, and an amount sufficient to make said composition calenderable of at least one second thermoplastic polymer which is miscible in the molten state with said thermoplastic polyurethane resin, said second thermoplastic polymer comprising PVC.

* * * * *